US012250936B2

(12) United States Patent
Plaut

(10) Patent No.: US 12,250,936 B2
(45) Date of Patent: Mar. 18, 2025

(54) INSECT TRAPPING

(71) Applicant: Rudolf Plaut, Lisvane (GB)

(72) Inventor: Rudolf Plaut, Lisvane (GB)

(*) Notice: Subject to any disclaimer, the term of this patent is extended or adjusted under 35 U.S.C. 154(b) by 7 days.

(21) Appl. No.: 16/754,650

(22) PCT Filed: Oct. 9, 2018

(86) PCT No.: PCT/GB2018/052879
§ 371 (c)(1),
(2) Date: Apr. 8, 2020

(87) PCT Pub. No.: WO2019/073215
PCT Pub. Date: Apr. 18, 2019

(65) Prior Publication Data
US 2020/0352151 A1 Nov. 12, 2020

(30) Foreign Application Priority Data

Oct. 9, 2017 (GB) ...................................... 1716504

(51) Int. Cl.
*A01M 1/02* (2006.01)
*A01M 1/10* (2006.01)
(Continued)

(52) U.S. Cl.
CPC ............ *A01M 1/023* (2013.01); *A01M 1/103* (2013.01); *A01M 1/14* (2013.01); *A01M 1/223* (2013.01)

(58) Field of Classification Search
None
See application file for complete search history.

(56) References Cited

U.S. PATENT DOCUMENTS

| 1,000,368 A * | 8/1911 | Borkenhagen ........ A01M 1/103 |
| | | 43/118 |
| 4,423,564 A * | 1/1984 | Davies .................... A01M 1/14 |
| | | 43/121 |

(Continued)

FOREIGN PATENT DOCUMENTS

| CN | 201045823 Y | 4/2008 |
| CN | 203167857 U | 9/2013 |

(Continued)

OTHER PUBLICATIONS

International Search Report and Written Opinion for International Application No. PCT/GB2018/052879 dated Mar. 8, 2019.

(Continued)

*Primary Examiner* — Peter M Poon
*Assistant Examiner* — Shada Mohamed Alghailani
(74) *Attorney, Agent, or Firm* — Umberg Zipser LLP; Ryan Dean

(57) ABSTRACT

The invention relates to an insect trapping device (100) comprising: a housing (110) having an opening (120) through which insects (I) can enter the housing; trapping means (130) for trapping insects within the housing; an attractant source (170) and regulating means for regulating a flow of an attractant (160) into the housing; propelling means (150) for evacuating at least a portion of the attractant from within the housing through the opening; control means communicatively coupled with the regulating means and propelling means; wherein the control means is configured to activate the propelling means once a threshold volume of attractant has accumulated within housing. Also disclosed is a method for of trapping insects. Advantageously, the present invention can effectively, consistently and quietly control the release of the attractant, where the attractant remains in the housing until the propelling means sends it through the opening, allowing the attractant to accumulate to a specified (Continued)

level in the housing and to be dispersed efficiently creating an effective lure for insects to follow into the traps.

26 Claims, 5 Drawing Sheets

(51) Int. Cl.
*A01M 1/14* (2006.01)
*A01M 1/22* (2006.01)

(56) References Cited

U.S. PATENT DOCUMENTS

| | | | | |
|---|---|---|---|---|
| 5,813,166 | A * | 9/1998 | Wigton | A01M 1/023 43/107 |
| 6,041,543 | A * | 3/2000 | Howse | A01M 1/04 43/132.1 |
| 8,973,299 | B2 | 3/2015 | Durand | |
| 2003/0175148 | A1* | 9/2003 | Kvietok | A01M 1/2077 422/5 |
| 2004/0200128 | A1* | 10/2004 | Metcalfe | A01M 1/106 43/107 |
| 2005/0210737 | A1 | 9/2005 | Durand et al. | |
| 2006/0242888 | A1* | 11/2006 | Bedoukian | A01M 1/06 43/107 |
| 2006/0254124 | A1 | 11/2006 | DeYoreo et al. | |
| 2009/0304763 | A1* | 12/2009 | Durand | A01N 37/36 424/409 |
| 2010/0037512 | A1* | 2/2010 | Durand | A01M 1/06 43/139 |
| 2011/0072712 | A1* | 3/2011 | Black | A01M 1/02 43/123 |
| 2011/0284653 | A1* | 11/2011 | Butler | A61L 9/127 239/34 |
| 2012/0285076 | A1* | 11/2012 | Banfield | A01M 1/14 43/132.1 |
| 2014/0369895 | A1* | 12/2014 | Turner | A61L 9/122 422/124 |
| 2018/0177175 | A1* | 6/2018 | Tsai | A01M 1/14 |
| 2019/0159440 | A1* | 5/2019 | Zheng | A01M 1/023 |

FOREIGN PATENT DOCUMENTS

| | | |
|---|---|---|
| CN | 105188360 | 12/2015 |
| CN | 205052592 U | 3/2016 |
| CN | 205266693 | 6/2016 |
| CN | 205378723 | 7/2016 |
| CN | 206078720 | 4/2017 |
| CN | 208908929 | 5/2019 |
| JP | 1996154553 | 6/1996 |
| JP | 2006051016 | 2/2006 |
| JP | 2015216877 | 12/2015 |
| JP | 2017007897 | 1/2017 |
| KR | 101476256 | 12/2014 |
| KR | 20170001755 U * | 5/2017 |
| KR | 1020170046430 A | 5/2017 |
| WO | WO 8912389 A1 * | 12/1989 |
| WO | 9811774 A1 | 3/1998 |
| WO | 2008115391 A2 | 9/2008 |
| WO | 2011123004 | 10/2011 |
| WO | 2014134371 | 9/2014 |
| WO | WO-2019007494 A1 * | 1/2019 |

OTHER PUBLICATIONS

UK Intellectual Property Office Search Report for Application No. GB1716504.4 dated Mar. 21, 2018.
Brazilian Office Action for Application No. BR112020006863-2 dated Jul. 27, 2022.

* cited by examiner

INSECT TRAPPING

The present invention relates to an improved method and devices for insect trapping.

Trapping insects using the present invention provides a more effective approach to attracting and capturing insects, particularly bed bugs. It combines a number of collection and elimination techniques with improved efficacy due to a synergistic combination of elements. It also reduces the amount of sprayed or broadcast chemicals that are used because of planned and controlled attractant releases.

Evidence suggests that the rise in global travel has led to the increase of bed bugs. Hotel operators are at risk of both accumulating and spreading bed bug infestations due to the high amount of human traffic they receive. Therefore, there is a constant need for improved measures to combat infestations. Measures range from do it yourself kits to highly technical devices; however, these all suffer individual problems and have commercial failings, ranging from poor efficiency to disproportionate cost.

One approach to capturing insects has been the use of pitfall traps. The essential components of a pitfall trap are a container or pit with an interior wall that cannot be scaled by the insect. For example, an insect that falls into the trap will be unable to escape because it cannot climb up the interior wall.

Another approach is to use sensory lures, attracting insects for example by sight, smell or noise. One chemical attractant used in insect traps is carbon dioxide. Carbon dioxide is exhaled by respiring animals and is a ubiquitous gas in the atmosphere. However, the air exhaled by humans comprises a greater concentration of carbon dioxide compared with that which is inhaled, and this increased concentration of carbon dioxide is detectable by insects. The sensory lure can mimic a source of carbon dioxide which attracts insects. $CO_2$ is the preferred attractant for many traps as a high proportion of insects species use $CO_2$ to track their food source. However, it is difficult to provide sufficient quantities of $CO_2$ over a period of time and above a threshold required to motivate an insect, which is representative of the concentration of an exhaling human/animal. $CO_2$ is most commonly produced in bulk formats at large manufacturing facilities, this $CO_2$ can then be distributed under pressure in suitable vessels. A further problem associated with large pressurised $CO_2$ use is that the release from such containers causes intermittent noise pollution and currently the means to possibly control this noise are only associated with volumes of $CO_2$ which are uneconomical and difficult to supply in environments for a bug trap.

These approaches have been combined to develop improved traps. However, producing and controlling the release of quantities of attractant that are sufficient to attract insects, especially carbon dioxide, has proven to be difficult. The creation of a consistent, adaptable and effective trap is still required. Therefore, there is a need for improved trapping methods and devices which are both efficient and effective in overcoming the problems of the prior art.

According to a first aspect of the present invention there is provided an insect trapping device comprising: a housing having an opening through which insects can enter the housing; trapping means for trapping insects within the housing; an attractant source and regulating means for regulating a flow of an attractant into the housing; propelling means for evacuating at least a portion of the attractant from within the housing through the opening; control means communicatively coupled with the regulating means and propelling means; wherein the control means is configured to activate the propelling means once a threshold volume of attractant has accumulated within housing.

Advantageously, the device of the present invention can effectively, consistently and quietly control the release of the attractant, where the attractant remains in the housing until the propelling means sends it through the opening. This allows the attractant to accumulate to a specified level in the volume and to be dispersed efficiently creating an effective lure for insects to follow into the traps.

In an embodiment, the insect trapping device may further comprise a power source, such as a battery.

In an embodiment, the trapping means may comprise an adhesive trap. The insect trapping device may comprises a further trapping means within the housing and wherein the further trapping means comprises an electrified trap. The further trapping means may be powered by the power source.

In an embodiment, the propelling means may comprise a fan or impeller.

In an embodiment, the attractant is provided from an attractant source which may comprise a source of carbon dioxide ($CO_2$), such as a $CO_2$ container, cartridge or canister.

In an embodiment, the attractant source is fluidly coupled to the housing via an inlet. The regulating means may be disposed within the inlet. The regulating means may be configured to release the attractant into the housing at a variable flow rate. The release regulating means may comprise a semipermeable membrane.

In an embodiment, the insect trapping device the control means may activate the propelling means at temporally separated intervals and durations and also activates the further trapping means at temporally separated intervals.

In an embodiment, the attractant source, the regulating means, trapping means, power source and propelling means are removably replaceable.

In an embodiment the control means, may comprise a timer and is configured to activates the fan propelling means at temporally separated intervals and/or predefined temporal durations.

According to a second aspect of the present invention there is provided a method of trapping insects comprising the steps: controlling and regulating the release of an attractant from an attractant source into an insect trapping device; accumulating attractant within the insect trapping device; activating a propelling means to release the attractant from the insect trapping device into an environment once a threshold volume of attractant has accumulated.

In an embodiment, the step of accumulating attractant may occur at a variable rate.

Furthermore the flow rate of attractant into the device is dependent upon a inner volume of the insect trapping device.

In an embodiment the step of activating the propelling means further comprises activating the propelling means at configurable temporally separated intervals and/or predefined temporal durations.

According to a third aspect of the present invention there is provided a insect trapping device configure to implement the method of trapping insects as described in relation to the second aspects and embodiments.

The invention may be performed in various ways and embodiments thereof will now be described, by way of example only, reference being made to the accompanying drawings, in which.

Figure 1:
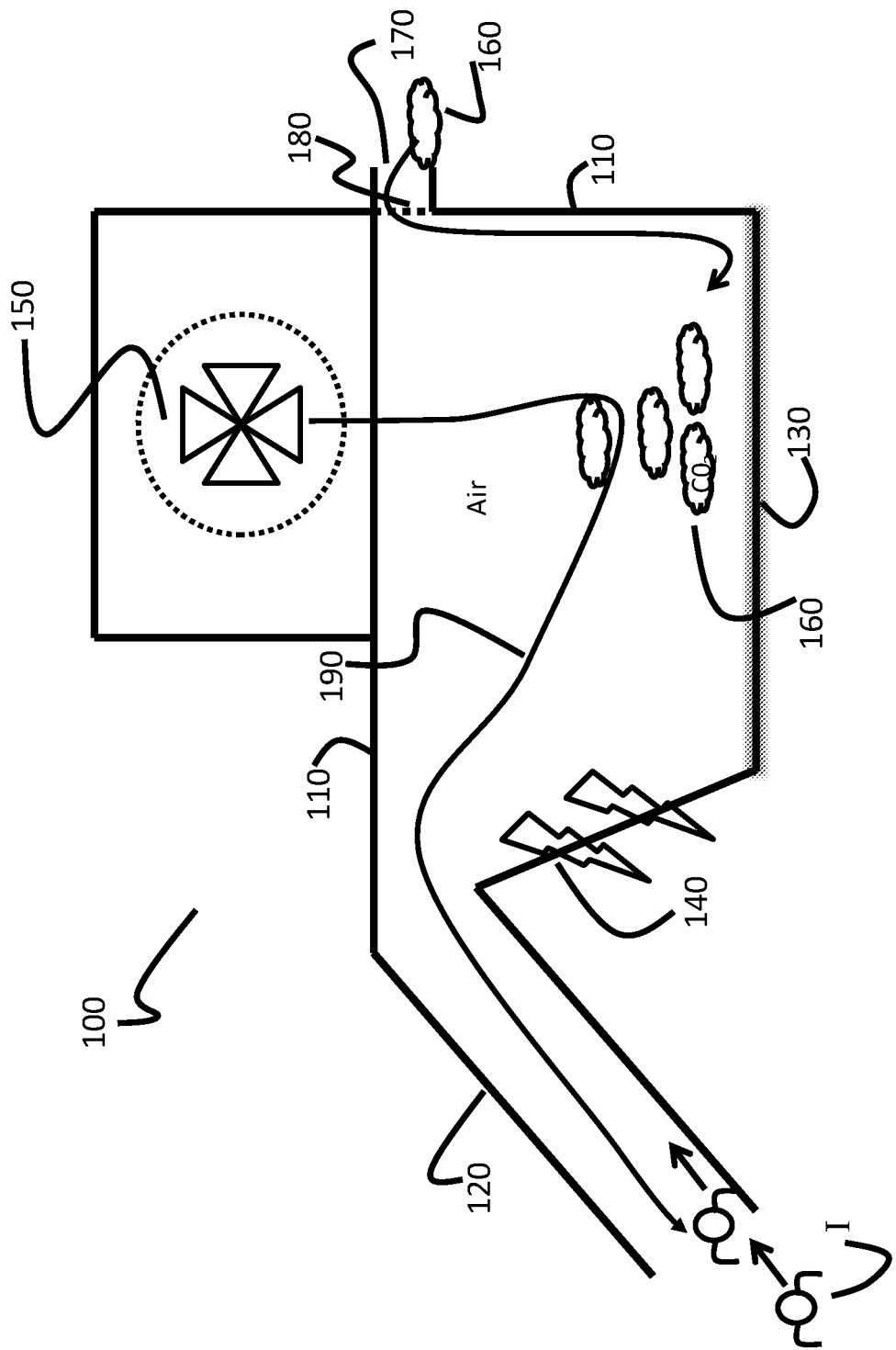
FIG. 1 is a diagram showing an embodiment of the insect trapping device according to the present invention.

Referring to FIG. 1 of the drawings, there is illustrated an insect trapping device (100) according to an embodiment of the present invention. The device has a housing (110) forming substantially the body of the device. The housing has an opening (120) located at one portion of the housing through which insects can enter an inner volume of the housing. Within the housing is a trapping means (130), in the embodiment shown is an adhesive trap. There is shown a further trapping means (140) also located within the housing, in located between the trapping means (130) and opening (120) in the embodiment this is an electrified trap. Attached to the housing is a means for propelling means (150) exemplified as a fan. Attractant (160) is disposed inside the housing; an example of the attractant to be used is CO2. The attractant is provide into the housing from an attractant source (170) connected to an attractant inlet (180) on the housing. The flow path (190) of the attractant and air from inside the housing out of the opening to insect (I) in the environment is shown.

In an example of use of the insect trapping device, one or more devices may be placed around an environment where there are insects. The device can be configured to be suitable for the environment and circumstances it will be placed into. Once the devices are placed or attached, they can be active immediately. Over a period of time the attractant accumulates within the housing from a quiet slow release source to a sufficient concentration level, in relation to an insect motivation level. The fan is then activated to propel the attractant out of the opening to lure insects into the housing. The insects follow the trail of the attractant to the trapping device. The insects enter the trapping device through the opening, which is the outer wall of a pitfall trap. Once the insects pass the opening they encounter the trapping means, where they perish. The accumulation and activation steps of the device are repeated until the features of the devices require replacement. The traps are emptied, battery replaced and attractant source refilled, then the trapping device can continue its work.

The insect trapping device (100) comprises a housing (110), which may take various shapes and sizes to suit the particular application e.g. being larger for larger insects, being constructed from more durable materials for harsher environments. It is envisaged that the housing encapsulates the features of the device such that the device may be provided in a self-contained arrangement ready for use.

In an embodiment, the housing comprises attachment means (not shown) for attaching the device to various surfaces, and may include clips, brackets, screws, adhesives etc. The housing further comprises various connecting points to connect further components of the invention, including for example, traps, power sources, attractant sources and propelling means.

The housing (110) has an opening (120) through which an insect (I) can enter the device. The opening shown in the FIG. 1 is an example of an opening that would be used with a pitfall trap. In this manner once an insect has passed the opening the insect will no longer be able to escape back out from the device via the opening. The opening comprises for example a stepped arrangement or maze type pathway leading to an inner volume of the housing wherein the traps are located. The housing is shaped so that the path of the insect will lead to interaction with the traps while moving towards the attractant. The housing may include more than one opening; furthermore the openings may be formed to improve dispersion characteristics, such as being a jet nozzle or fanned.

FIG. 1 shows a trapping means (130) and a further trapping means (140) in an exemplary embodiment. In the embodiment shown, the trapping means (130) is an adhesive trap, which can comprises a surface with an adhesive such as glue, disposed thereon. When an insect comes into contact with the adhesive it becomes trapped. Once a suitable number of insects have become trapped/a period of time has passed, the trap can be removed and the adhesive pad replaced. In the embodiment shown, the further trapping means (140) is an electrified trap, which can comprise an electrically conductive grid, wherein a constant or periodic voltage is provided across the grid, when an insect comes into contact with the active grid it is electrified. Similar to other trapping means, once a suitable number of insects have become trapped/a period of time has passed, the trap can be removed and the trapped insects may be removed and the trap replaced, or, in the case of wear replaced with a new trap.

Other traps are envisaged that could be used some examples are chemical based, such as material impregnated with insecticide, a pressure based trap which can crush the insect, a light or visual based attractant, or a heat source attractant. It will be appreciated that in the shown embodiment there is a synergy between the adhesive trapping means and electrified trapping means, whereby if the electrified trap is placed before the adhesive, the insects are electrified and then fall onto the adhesive where they become stuck. It is found that this arrangement minimises the cleaning of the device.

FIG. 1 shows a propelling means (150), which can be a fan in the embodiment shown or a blower, ventilator etc. which when operated causes a path of air to flow (190) from the fan through the inner volume of the housing (110) and out of the opening. Within the housing is the attractant, the flow path from the fan disturbs the attractant and carries it out of the opening, where the attractant will be identified by the insects causing them to follow the flow path to the source of the attractant and in doing so enter the trapping device. Within the volume the attractant can accumulate to a controlled degree if provided from an attractant source. In an example where the attractant is $CO_2$, as $CO_2$ is heavier than air and there is no dispersive motion within the volume, the $CO_2$ accumulates in the housing. The fan can be programmed to operate when the $CO_2$ has accumulated to a threshold amount, which is sufficient to attract the insects.

The attractant (160) shown in FIG. 1 is a substance suitable for dispersal by the propelling means. In an exemplary embodiment, the attractant is $CO_2$, this is a well known attractant for most insects. The attractant within the volume may be provided from an attractant source (170) connected to or within the housing (110). The attractant source can be connected to the housing by an inlet (180). The attractant source may be any type of suitable container, cartridge, canister, effusing source etc. The container is arranged to control the release of the attractant into the volume. The release of attractant into the volume of the housing may be controlled by an additional semipermeable membrane (such as a ceramic membrane) within the inlet; an alternative embodiment may be a slow release valve or the like. The semipermeable membrane or slow release valve can help to reduce the noise created by the trap. The use of such a control means allows for controlled release of the attractant, this can work synergistically with the activation of the propelling means, such that the most suitable amount of attractant can be released, this may be dependent on factors such as the size of the outside environment or species of insect to be trapped.

Additionally, the insect trapping device includes a control means (not shown) which may comprise a control circuit or a microcontroller with internal timing. The means may be connected to or provided within the housing. The device may be preprogrammed for a suitable operation, or have the ability to be varied, such as via a switch placed on the device, or by reprogramming the timing and control means physically or wirelessly. The timing and control means is arranged to control the power supply and the timing of an activation of any connected feature in the insect trapping device, including a power source, propelling means, trapping means or attractant source. The features may be activated at temporally separated intervals, varying durations and occurrences. The control allows for the creation of specific modes of operation, for example, night time modes where the attractant release must be higher due to a person in the environment as a competing source, different insect types modes configured to the natural instinct of a particular insect. The types of operation could be for example, the fan operates for a 5 second duration once an hour for between the times of 9 am and 9 pm and for 10 second durations twice an hour for times outside that range. The duration and occurrence of operation is selected to ensure sufficient dispersal of the attractant from the volume of the housing out through the opening, and also sufficient time to allow a suitable accumulation of attractant within the housing, respectively. The control means may additionally operate the further trappings means, e.g. electrified trap, to work synergistically with the attractant release, such that it only operates periodically to conserve power.

Additionally, the insect trapping device may include a power source (not shown), for example a battery, solar cells or mains connection. The power source may be connected to or provided within the housing. The power source is capable of providing power to all the features of the trapping device.

The entirety of the insect trapping device is envisaged to be modular such that features are removably replaceable. For example as the insect device progresses its operation the traps may become full, these can be removed and either cleaned and replaced or a new part added. This also allows for the traps to be upgraded, if a better version becomes available to a more suitable trap needs to be used. Simply replacements of batteries and the attractant source can happen when required. In this way kits of parts can be provided for use with the device.

Figure 2:
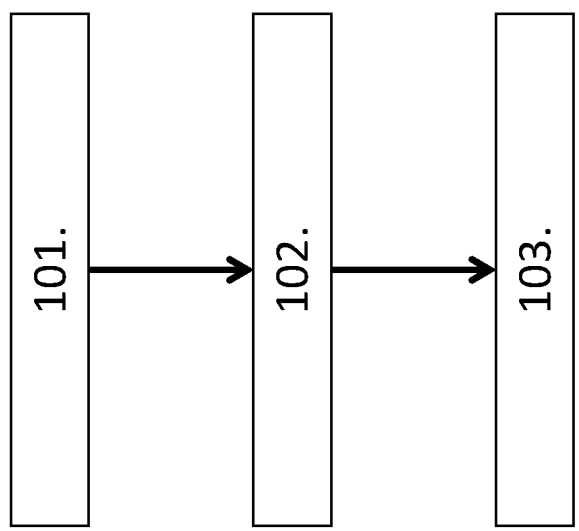
FIG. 2 is a flow diagram showing an embodiment of the method according to the present invention; and, FIGS. 3, 4 and 5 show the results of a laboratory study using the apparatus and method of the present invention.

A method of trapping insects is described below with reference to FIG. 2. The method uses an insect trapping device as described in the present invention. The method includes the steps of controlling and regulating the release of an attractant from an attractant source into an insect trapping device (101); accumulating attractant within the insect trapping device (102); activating a propelling means to release the attractant from the insect trapping device into an environment once a threshold volume of attractant has accumulated (103). Once these steps are complete insects will be attracted to the device wherein they will be trapped. The method can be further modified to suit the environment and the particular insect variety that it is intended to lure. The activation and duration of the device in accordance with the method can be varied; the operations may be temporally spaced as can the occurrence rate and duration of activation. The amount and type of attractant provided to the device may be modified in response to environmental and usage requirements. The trapping means of the device can be similarly operated at variable time intervals. The method can comprise a further step, wherein, once the device has been used for a period of time the attractant means, the trapping means, power source and means for propelling may be removed and replaced, then the method can be started again.

Figure 3:
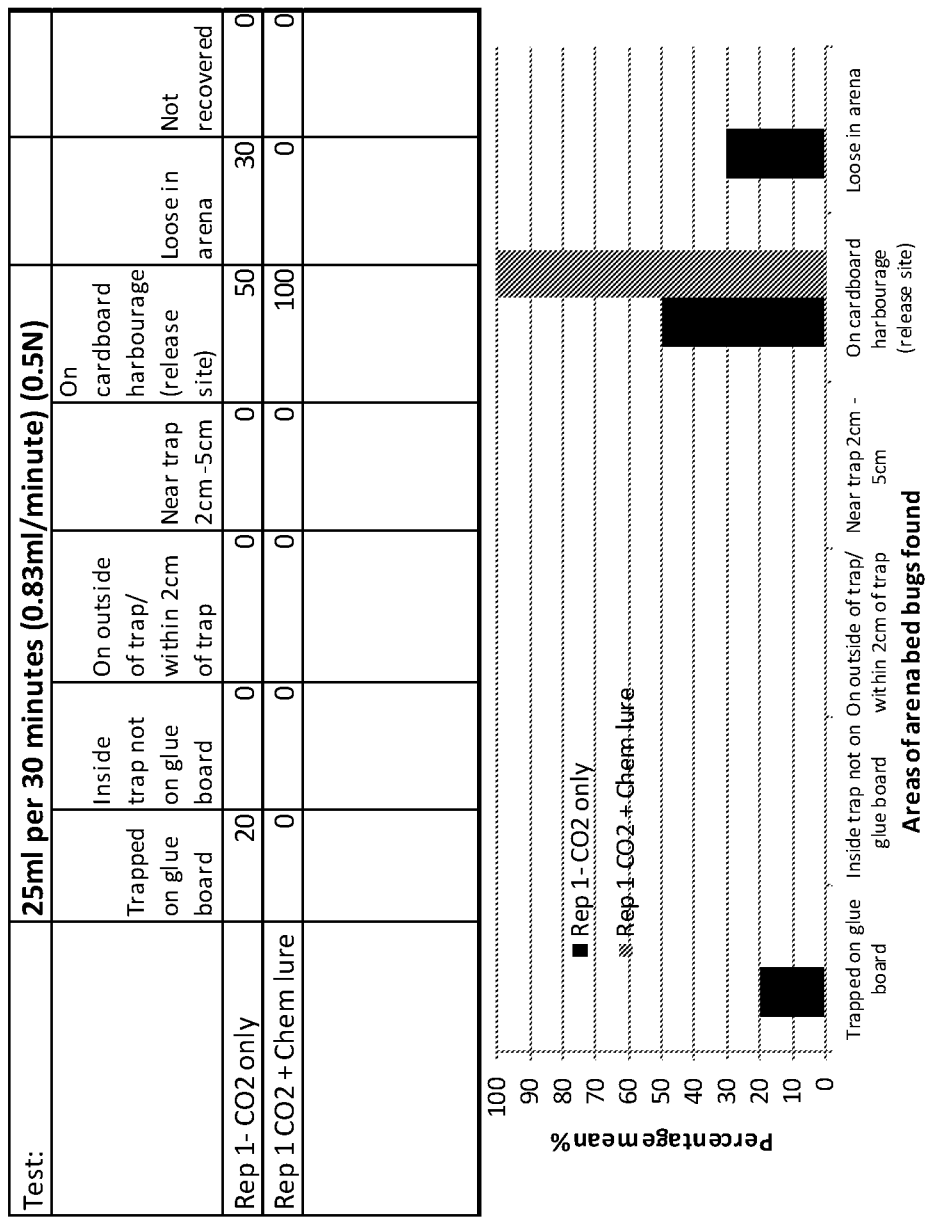
Figure 4:
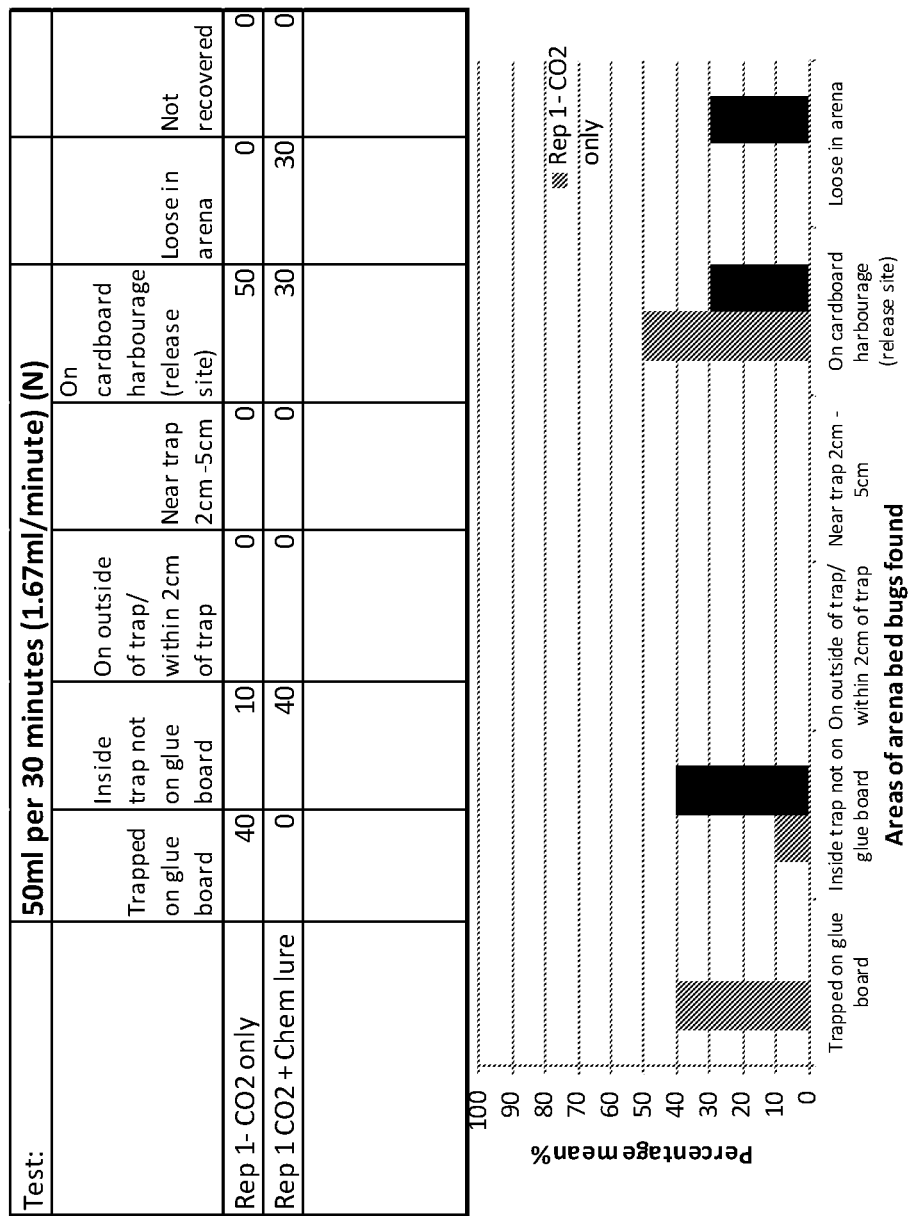
Figure 5:
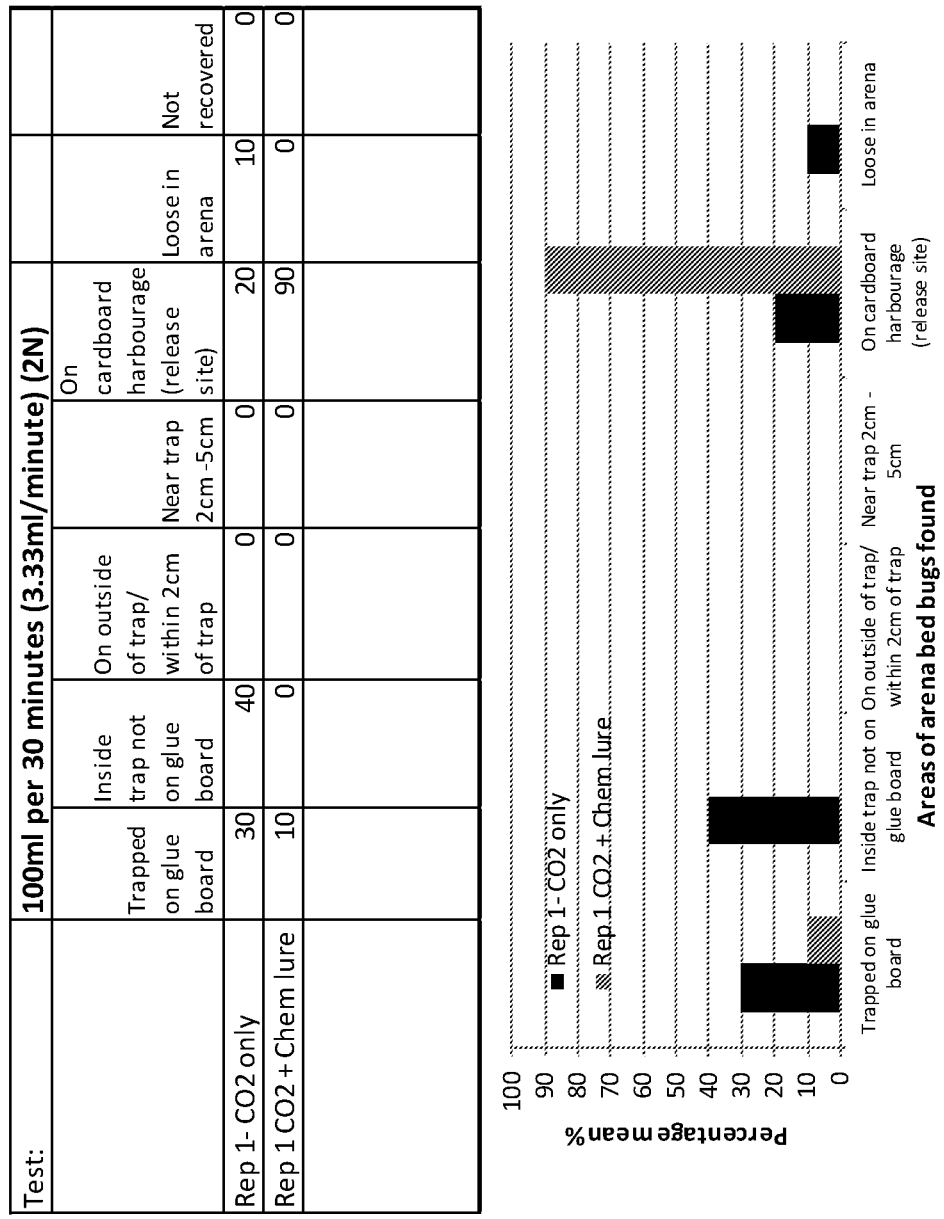

The surprisingly effective results of a laboratory test using the method and device of the present invention are shown in FIGS. 3, 4 and 5. The laboratory trial was to determine the efficacy of a trap and attractants/lures against bed bugs (*Cimex lectularius*). The test comprises a simple captured arena from which the bugs cannot escape a trap such as described in the embodiments of the invention was also placed into the arena. Ten bed bugs were introduced to an arena, where the lures were located and assessment was made six hours post bed bug release.

Assessment was based on whether the bugs were: trapped on glue board; inside trap but not on glue board; on the outside of the trap/within 2 cm of trap; near the trap 2 cm-5 cm; on the cardboard harbourage (release site); loose in the arena; or, not recovered. FIG. 3 shows results from the test where the parameters were set to release 25 ml of $CO_2$ per 30 minutes (0.83 ml/minute). FIG. 4 shows results from the test where the parameters were set to release 50 ml of $CO_2$ per 30 minutes (1.67 ml/minute). FIG. 5 shows results from the test where the parameters were set to release 100 ml of $CO_2$ per 30 minutes (3.33 ml/minute). The insect trapping device propelling means (i.e. fan) were activated every 30 minutes for duration of 10 seconds per activation. The important statistics are whether the bugs were trapped or inside the trap, in the FIG. 3 test only 20% of bugs were attracted and trapped, this rose to 50% in FIG. 4 test and, raised again in the FIG. 5 test to 70%. Therefore as the amount of CO2 increased as did the efficiency of the trap.

It will be appreciated that the insect trapping device and method of trapping insects in accordance with the present invention can be suitably modified for use in various circumstances, such as in a hotel, green house or even outdoors in crop fields. The advantages of the device are scalable and applicable to all challenges involving the trapping of insects in various environments.

The invention claimed is:
1. A bed bug trapping device comprising:
a base;
a housing that defines an inner volume;
wherein the inner volume is for receiving a flow of attractant, from an attractant source;
a pitfall trap, the pitfall trap comprising an adhesive trap and a trap entrance positioned relative to the adhesive trap such that, when the base is horizontally mounted on a surface, the trap entrance is positioned above a level of the adhesive trap, and an electrifiable trap positioned relative to the trap entrance and the adhesive trap such that bed bugs that pass from the trap entrance to the electrifiable trap are electrified by the electrifiable trap, when the electrifiable trap is electrified, and fall onto the adhesive trap, whereby the bed bugs adhere to the adhesive trap such that they are trapped;
a conduit that fluidly connects a bed bug entry opening to the inner volume of the housing;
the conduit having a floor, for bed bugs to crawl along inside the conduit, that extends from, or proximal to, the bed bug entry opening to the pitfall trap entrance;
wherein the pitfall trap entrance is positioned relative to the bed bug entry opening such that, when the base is horizontally mounted on the surface, the pitfall trap entrance is located above the level of the bed bug entry opening and, as the conduit floor extends from, or from proximal to, the bed bug entry opening to the entrance of the pitfall trap, at least part of the floor slopes upwardly to form a bed bug ramp that is inclined at an obtuse exterior angle to a horizontal;

propelling means for evacuating at least a portion of the attractant from within the inner volume of the housing, along the conduit and through the bed bug entry opening, out of the housing;

wherein the bed bug entry opening is for bed bugs, attracted by the attractant passing along the conduit and out through the bed bug entry opening, to crawl into the housing through the bed bug entry opening and to crawl along the conduit floor, up the bed bug ramp, to the entrance of the pitfall trap, pass to the electrifiable trap, are electrified by the electrifiable trap, when the electrifiable trap is electrified, and fall onto the adhesive trap, whereby the bed bugs adhere to the adhesive trap such that they are trapped;

control means communicatively coupled with the propelling means;

wherein the control means is configured to activate the propelling means once a threshold volume of the attractant has accumulated within said inner volume of the housing.

2. The bed bug trapping device as claimed in claim 1, wherein the bed bug trapping device comprises a regulating means for regulating the flow of the attractant into said inner volume of the housing.

3. The bed bug trapping device as claimed in claim 2, wherein the control means is communicatively coupled with the regulating means.

4. The bed bug trapping device as claimed in claim 1, wherein the propelling means is a fan or impeller.

5. The bed bug trapping device as claimed in claim 1, wherein the device comprises an attractant source arranged to supply attractant to the inner volume of the housing.

6. The bed bug trapping device as claimed in claim 3, wherein the control means is configured such that the attractant is released into said inner volume of the housing for a predefined temporal duration.

7. The bed bug trapping device as claimed in claim 2, wherein the regulating means comprises a valve and/or a semi-permeable membrane.

8. The bed bug trapping device as claimed in claim 1, wherein the control means comprises a timer and is configured to activate the propelling means at temporally separated intervals.

9. The bed bug trapping device as claimed in claim 1, wherein the control means comprises a timer and is configured to activate the propelling means for a predefined temporal duration.

10. The bed bug trapping device as claimed in claim 1, wherein the control means comprises a timer and is configured to activate the propelling means at temporally separate intervals for a predefined temporal duration.

11. A method of trapping bed bugs using a bed bug trapping device, the bed bug trapping device comprising:
a base;
a housing that defines an inner volume;
wherein the inner volume is for receiving a flow of attractant, from an attractant source;
a pitfall trap, the pitfall trap comprising an adhesive trap and a trap entrance positioned relative to the adhesive trap such that, when the base is horizontally mounted on a surface, the trap entrance is positioned above a level of the adhesive trap, and an electrifiable trap positioned relative to the trap entrance and the adhesive trap such that bed bugs that pass from the trap entrance to the electrifiable trap are electrified by the electrifiable trap, when the electrifiable trap is electrified, and fall onto the adhesive trap, whereby the bed bugs adhere to the adhesive trap such that they are trapped;
a conduit that fluidly connects a bed bug entry opening to the inner volume of the housing;
the conduit having a floor, for bed bugs to crawl along inside the conduit, that extends from, or proximal to, the bed bug entry opening to the pitfall trap entrance;
wherein the pitfall trap entrance is positioned relative to the bed bug entry opening such that, when the base is horizontally mounted on the surface, the pitfall trap entrance is located above the level of the bed bug entry opening and, as the conduit floor extends from, or from proximal to, the bed bug entry opening to the entrance of the pitfall trap, at least part of the floor slopes upwardly to form a bed bug ramp that is inclined at an obtuse exterior angle to a horizontal;
propelling means for evacuating at least a portion of the attractant from within the inner volume of the housing, along the conduit and through the bed bug entry opening, out of the housing;
wherein the bed bug entry opening is for bed bugs, attracted by the attractant passing along the conduit and out through the bed bug entry opening, to crawl into the conduit through the bed bug entry opening and to crawl along the conduit floor, up the bed bug ramp, to the entrance of the pitfall trap, pass to the electrifiable trap, are electrified by the electrifiable trap, when the electrifiable trap is electrified, and fall onto the adhesive trap, whereby the bed bugs adhere to the adhesive trap such that they are trapped;
control means communicatively coupled with the propelling means;
wherein the control means is configured to activate the propelling means once a threshold volume of the attractant has accumulated within said inner volume of the housing;
the method comprising:
receiving a flow of attractant into the inner volume of the housing, from an attractant source;
accumulating the attractant within said inner volume of the housing;
once a threshold volume of the attractant has accumulated within said inner volume of the housing activating the propelling means, with the control means, to evacuate at least a portion of the attractant from within the inner volume of the housing, along the conduit and through the beg bug entry opening, out of the housing;
attracting bed bugs with the attractant that has passed along the conduit and out through the beg bug entry opening, such that the bed bugs crawl into the conduit through the beg bug entry opening and crawl along the conduit floor, up the bed bug ramp, to the entrance of the pitfall trap, pass to the electrifiable trap, are electrified by the electrifiable trap, when the electrifiable trap is electrified, and fall onto the adhesive trap, whereby the bed bugs adhere to the adhesive trap such that they are trapped.

12. The method of trapping bed bugs as claimed in claim 11, wherein the bed bug trapping device comprises a regulating means for regulating the flow of the attractant into said inner volume of the housing and the method comprises regulating the flow of attractant from the attractant source into the inner volume of the housing, using the regulating means.

13. The method of trapping bed bugs as claimed in claim 12, wherein the control means is communicatively coupled with the regulating means.

14. The method of trapping bed bugs as claimed in claim 11, wherein the step of activating the propelling means comprises activating the propelling means at configurable temporally separated intervals and/or for predefined temporal durations.

15. The bed bug trapping device of claim 1, wherein the pitfall trap entrance is in fluid communication with an upper part of the inner volume.

16. The bed bug trapping device of claim 1, wherein the housing has a single said bed bug entry opening, that does not extend around the entirety of the periphery of the housing.

17. The method of claim 11, wherein the pitfall trap entrance is in fluid communication with an upper part of the inner volume.

18. The method of claim 11, wherein the housing has a single said bed bug entry opening, that does not extend around the entirety of the periphery of the housing.

19. The bed bug trapping device of claim 1, wherein the bed bug ramp extends from, or proximal to, the bed bug entry opening to the entrance of the pitfall trap.

20. The method of claim 11, wherein the bed bug ramp extends from, or proximal to, the bed bug entry opening to the entrance of the pitfall trap.

21. The bed bug trapping device of claim 1 comprising a power source configured to provide a periodic voltage across the electrifiable trap.

22. The method of claim 11, wherein a periodic voltage is applied across the electrifiable trap.

23. The bed bug trapping device of claim 1 wherein the electrifiable trap is oriented such that, when the base is horizontally mounted on the surface, the electrifiable trap slopes downwardly from the pitfall trap entrance, towards the adhesive trap.

24. The method of claim 11 wherein, when the base is horizontally mounted on the surface, the electrifiable trap slopes downwardly from the pitfall trap entrance, towards the adhesive trap.

25. The method of claim 13, wherein the control means is configured such that the attractant is released into said inner volume of the housing for a predefined temporal duration.

26. The bed bug trapping device as claimed in claim 5, wherein the attractant source comprises a source of $CO_2$.

* * * * *